United States Patent
Kao

(10) Patent No.: US 7,379,756 B2
(45) Date of Patent: May 27, 2008

(54) SMART ANTENNA FOR WIRELESS LOCAL AREA NETWORK

(75) Inventor: Meng-Hua Kao, Taipei Hsien (TW)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 1287 days.

(21) Appl. No.: 10/463,667

(22) Filed: Jun. 18, 2003

(65) Prior Publication Data

US 2004/0077377 A1 Apr. 22, 2004

(30) Foreign Application Priority Data

Oct. 17, 2002 (TW) .............................. 91123994 A

(51) Int. Cl.
*H04M 1/00* (2006.01)
(52) U.S. Cl. ................ 455/562.1; 455/561; 455/575.7
(58) Field of Classification Search ............ 455/562.1, 455/561, 67.11, 67.16, 25, 575.7, 63.4, 452.2, 455/513; 342/372, 373; 370/334; 375/346
See application file for complete search history.

(56) References Cited

U.S. PATENT DOCUMENTS 6,473,036 B2 * 10/2002 Proctor, Jr. ................. 342/372
2001/0047424 A1 * 11/2001 Alastalo et al. ............ 709/236

* cited by examiner

*Primary Examiner*—Melur Ramakrishnaiah
(74) *Attorney, Agent, or Firm*—Winston Hsu

(57) ABSTRACT

A method for receiving radio frequency signals by using an access point. The access point contains a plurality of smart antennas and a processor. The method includes following steps: (a) using the plurality of smart antennas to receive first radio signals at a first time, the first radio signals including a plurality of vectors, each vector having a phase; (b) using the processor to sum up vectors having the same phase in the first radio signals received by the plurality of smart antennas respectively and to compare sums of the vectors having the same phase to find a first phase; (c) using the processor to weigh second radio signals received by the plurality of smart antennas at a second time according to the first phase and to sum up the weighed second radio signals.

6 Claims, 5 Drawing Sheets

US 7,379,756 B2

SMART ANTENNA FOR WIRELESS LOCAL AREA NETWORK

BACKGROUND OF THE INVENTION

1. Field of the Invention

The present invention relates to a method for receiving radio signals by using an access point, and more particularly, to a method for weighing radio signals received by the access point at a second time with a set of weighing factors generated according to radio signals received by the access point at a first time.

2. Description of the Prior Art

Owing to the rapid development of wireless communications technologies, an access points (AP) is becoming one of the most popular communications tools. An AP receives radio signals transmitted by a wireless network subscriber with an appendant antenna.

Please refer to FIG. 1, which is a schematic diagram of a plurality of radio signals 10 projected onto an AP 20 according to the prior art. The AP 20 comprises an antenna 12. An angle θ is included between the AP 20 and wave fronts of the radio signals 10. A distance between two neighboring radio signals (for example, nodes M and N shown in FIG. 1) is d. Because a path difference between any two neighboring radio signals equals d cos θ, if d cos θ is a multiple of the wavelength of the radio signals 10, the intensity of a radio signal projected onto node M equals the intensity of a radio signal projected onto node N. On the contrary, if d cos θ is not a multiple of the wavelength of the radio signals 10, the intensity of a radio signal projected onto node M does not equal the intensity of a radio signal projected onto node N. That is, if d cos θ is a multiple of the wavelength of the radio signals 10, and the intensity of a radio signal projected onto node M is stronger than that of a radio signal projected onto a node neighboring to node M, the intensity of a radio signal projected onto node N is also stronger than that of radio signals projected onto nodes neighboring to node N. Therefore, if the AP 20 receives itself radio signals 10 with only one antenna, a user for the AP 20 has to move the antenna 12 of the AP 20 to a position near node M (or node N) from time to time to get the radio signals having the strongest intensity.

In order to solve the above-mentioned problem, prior art APs adopt diversity antennas to receive the radio signals 10. Please refer to FIG. 2, which is a schematic diagram of another AP 30 according to the prior art. The AP 30 comprises a first antenna 32, a second antenna 34, a controller 36, a switching circuit 38, and a receiver 40. The controller 36 controls the switching circuit 38 to selectively connect the first antenna 32 or the second antenna 34 to the receiver 40 by periodically detecting the power of radio signals received by the first antenna 32 and by the second antenna 34. For example, if the controller 36 detects that the power of radio signals received by the second antenna 34 is greater than that of radio signals received by the first antenna 32 during a first period, the controller 36 then controls the switching circuit 38 to connect the second antenna 34 to the receiver 40. Thus, the receiver 40 of the AP 30 continues to receive radio signals transmitted from the second antenna 34 during the first period. As another example, if the controller 36 detects that the power of radio signals received by the first antenna 32 is greater than that of radio signals received by the second antenna 34 during a second period, the controller 36 then controls the switching circuit 38 to connect the first antenna 32 to the receiver 40. Thus, the receiver 40 of the AP 30 continues to receive radio signals transmitted from the first antenna 32 during the second period. Therefore, with the help of the controller 36 and the switching circuit 38, a user of the AP 30 does not need to move the AP 30 from time to time to receive radio signals with higher intensity. However, because the AP 30 receives radio signals with only one antenna at the same time, the signal-to-noise ratio of radio signals received by the AP 30 is not high.

SUMMARY OF THE INVENTION

It is therefore a primary objective of the claimed invention to provide a method for receiving radio signals having as high intensities as possible by using an access point to solve the above-mentioned problems.

According to the claimed invention, the access point comprises a plurality of smart antennas and a processor. The method comprises following steps: (a) using the plurality of smart antennas to receive first radio signals at a first time, the first radio signals comprising a plurality of vectors, each vector having a phase; (b) using the processor to sum up vectors having the same phase in the first radio signals received by the plurality of smart antennas respectively and to compare sums of the vectors having the same phase to find a first phase; (c) using the processor to weigh second radio signals received by the plurality of smart antennas at a second time according to the first phase and to sum up the weighed second radio signals.

It is an advantage of the claimed invention that a method for weighing radio signals received by the plurality of antennas of the AP with a plurality of weighting factors generated by the processor of the AP based on radio signals received by the plurality of antennas of the AP at a first time can improve SNR.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
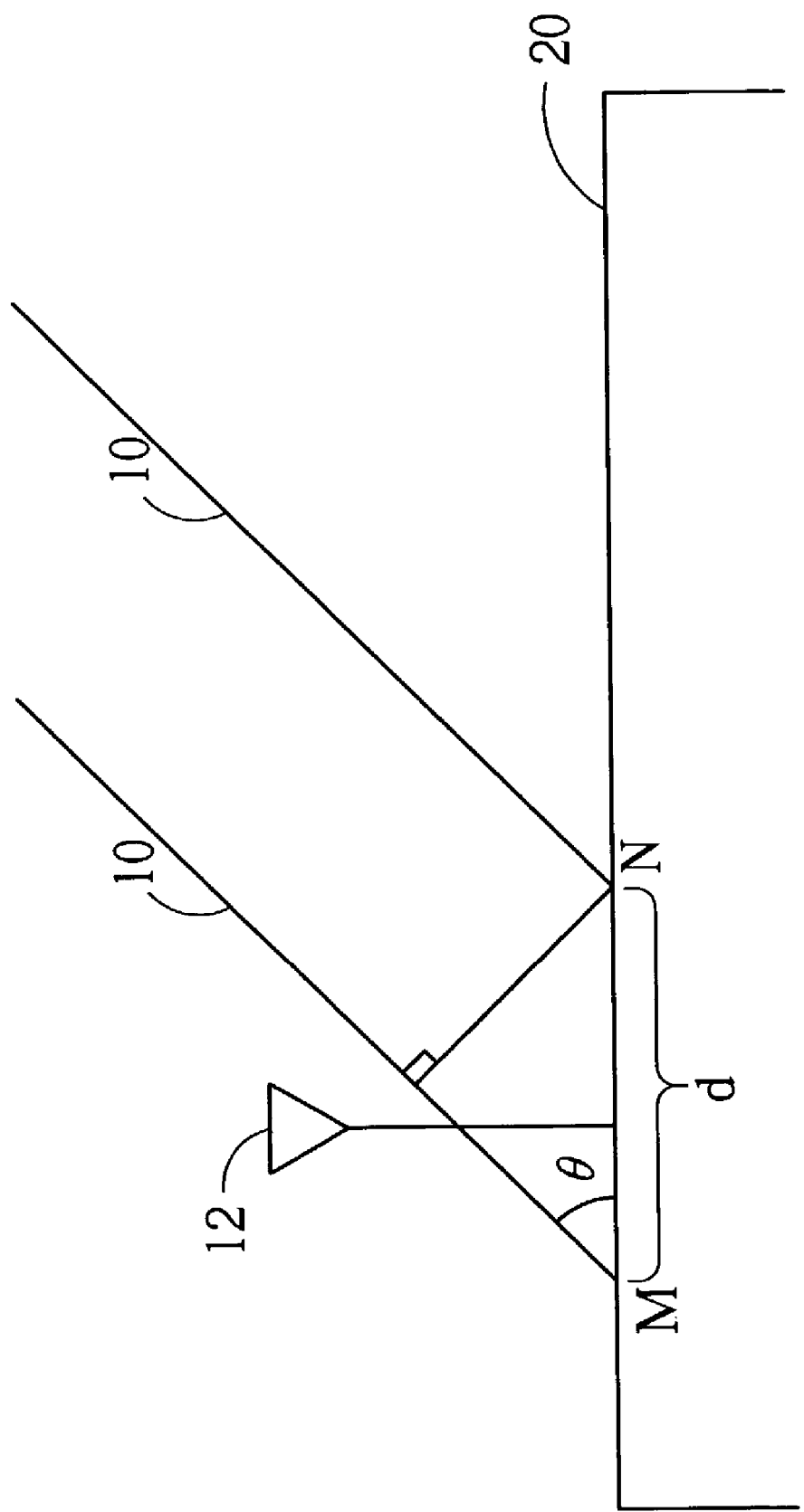
FIG. 1 is a schematic diagram of radio signals projected onto an access point according to the prior art.
Figure 2:
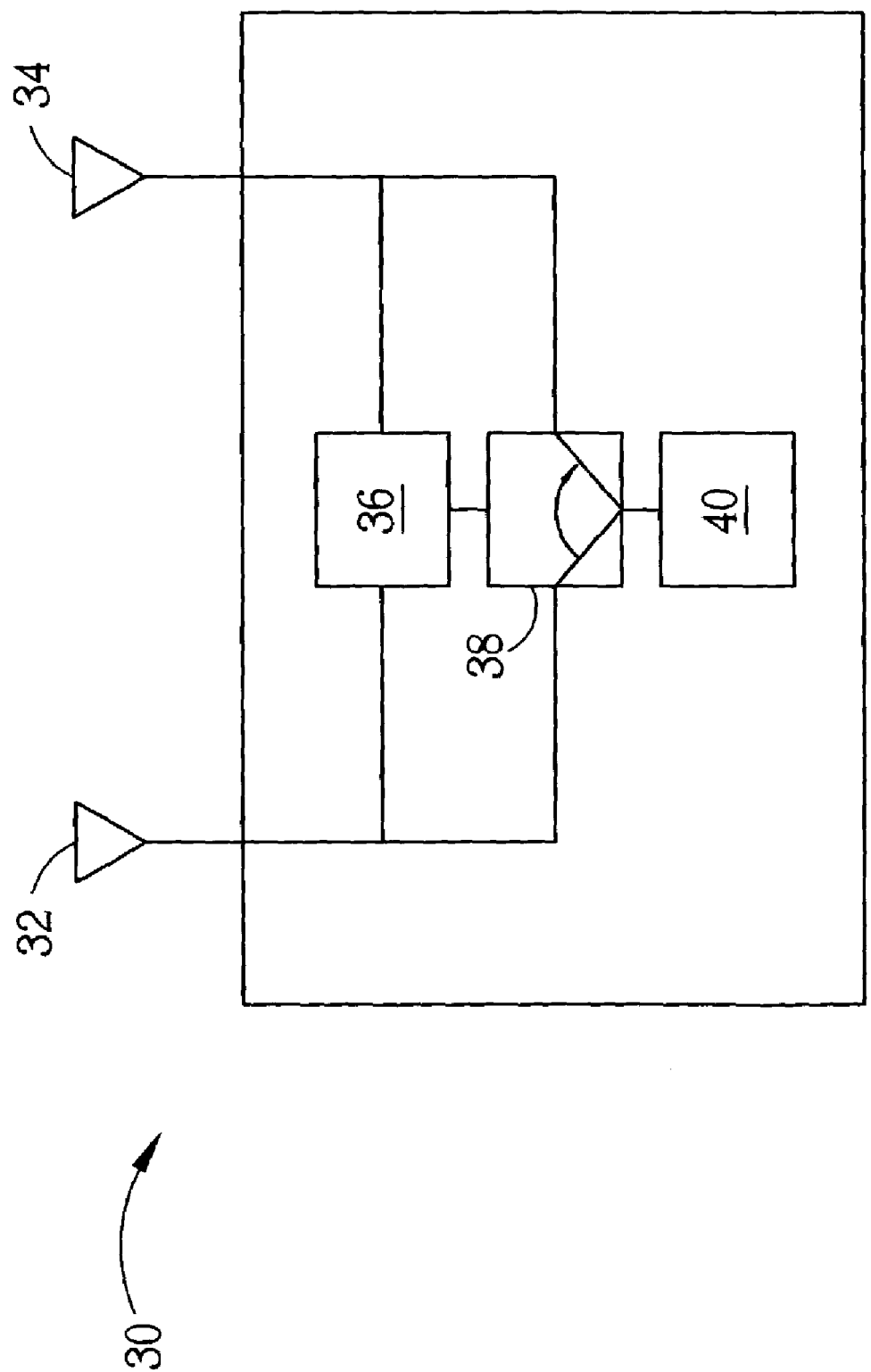
FIG. 2 is a function block diagram of an access point according to the prior art.
Figure 3:
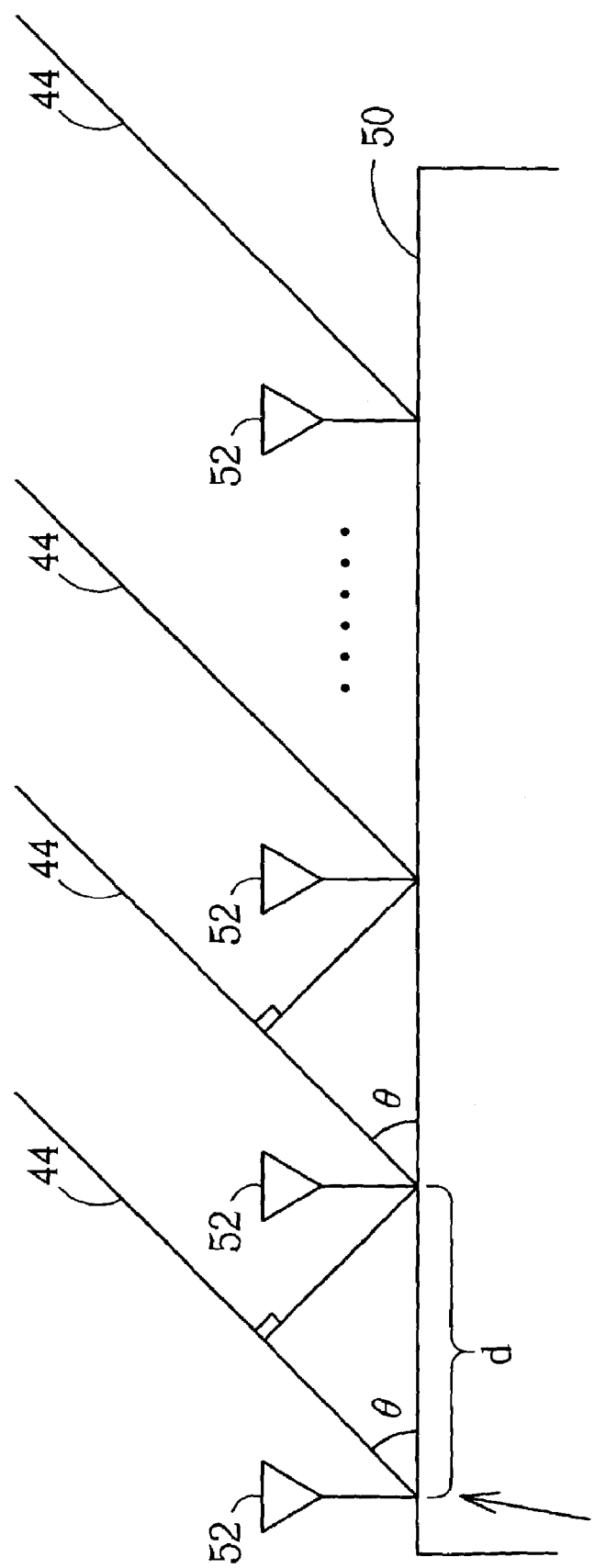
FIG. 3 is a schematic diagram of radio signals projected onto an access point according to the present invention.

Principles applied by the present invention are described as follows: Please refer to FIG. 3, which shows a plurality of radio signals 44 transmitted by a wireless network subscriber (not shown) to the AP 50 according to the present invention. The AP 50 comprises a plurality of smart antennas 52. As shown in FIG. 3, because an angle θ is included between the wave fronts of the radio signals 44 and the AP 50, and a distance between two neighboring smart antennas 52 is d, a path difference between radio signals received by two neighboring smart antennas 52 is d cos θ. Therefore radio signals received by the plurality of smart antennas 52 of the AP 50 at a first time are $$Y(t) = S(t) * \left[ e^{-2j\frac{\pi}{\lambda} \cdot 0 \cdot d\cos\theta} \quad e^{-2j\frac{\pi}{\lambda} \cdot 1 \cdot d\cos\theta} \quad \ldots \quad e^{-2j\frac{2\pi}{\lambda} \cdot (N-1) \cdot d\cos\theta} \right], \quad \text{(Eq. 1)}$$

wherein S(t) is a radio signal received by a smart antenna indicated by an arrow shown in FIG. 3, and N is the number of the plurality of smart antennas 52. Then project Y(t) onto an orthogonal basis to generate a projected radio signal V(t). That is, $$V(t) = Y(t) * \begin{bmatrix} e^{-j2\pi \cdot 0 \cdot 0/M} & e^{-j2\pi \cdot 0 \cdot 1/M} & \ldots & e^{-j2\pi \cdot 0 \cdot (M-1)/M} \\ e^{-j2\pi \cdot 1 \cdot 0/M} & \ldots & \ldots & \ldots \\ \vdots & \vdots & \ddots & \vdots \\ e^{-j2\pi \cdot (N-1) \cdot 0/M} & \ldots & \ldots & e^{-j2\pi \cdot (N-1) \cdot (M-1)/M} \end{bmatrix} = S(t) * Q,$$

wherein $$Q^T = \begin{bmatrix} y_0 \cdot e^{-j2\pi \cdot 0 \cdot 0/M} + y_1 \cdot e^{-j2\pi \cdot 0 \cdot 1/M} + \ldots + y_{N-1} \cdot e^{-j2\pi \cdot 0 \cdot (M-1)/M} \\ y_0 \cdot e^{-j2\pi \cdot 1 \cdot 0/M} + y_1 \cdot e^{-j2\pi \cdot 1 \cdot 1/M} + \ldots + y_{N-1} \cdot e^{-j2\pi \cdot 1 \cdot (M-1)/M} \\ \vdots \\ y_0 \cdot e^{-j2\pi \cdot (N-1) \cdot 0/M} + y_1 \cdot e^{-j2\pi \cdot (N-1) \cdot 1/M} + \ldots + \\ y_{N-1} \cdot e^{-j2\pi \cdot (N-1)(M-1)/M} \end{bmatrix},$$

wherein $y_h$ is a radio signal received by the (h+1)th smart antenna 52 of the AP 50, and $y_h e^{-j2\pi hm/M}$ is the (m+1)th component of a frequency spectrum having a resolution of M and projected by radio signals received by the (h+1)th smart antenna 52 onto the orthogonal basis. Each element of V(t) represents a sum of components having the same phase and projected by radio signals received by the plurality of smart antenna 52 onto the orthogonal basis. Then calculate a phase θ' corresponding to the largest value in V(t). For example, if the largest value in V(t) is the m'th component, because λ, M, and d are all constants, the phase θ' equals $\cos^{-1}(m'\lambda/Md)$. Then weigh radio signals received by the plurality of smart antenna 52 at a second time with corresponding weighing factors calculated according to the phase θ'. The weighing factor corresponding to the radio signal received by the hth smart antenna at the second time is $e^{j2\pi(h-1)/\lambda*d \cos \theta'} = e^{j2\pi(h-1)m'/M}$. Therefore, radio signals received by the plurality of smart antennas 52 of the AP 50 at the second time are transformed to be $$Y'(t) = Y(t) * W = s(t) [e^{j2\pi \cdot 0 \cdot d(\cos \theta' - \cos \theta)/\lambda} + e^{j2\pi \cdot 1 \cdot d(\cos \theta' - \cos \theta)/\lambda} + \ldots + e^{j2\pi \cdot (N-1) \cdot d(\cos \theta' - \cos \theta)/\lambda}],$$

wherein, $$W = \begin{bmatrix} e^{j\frac{2\pi}{\lambda} \cdot 0 \cdot d\cos\theta'} \\ e^{j\frac{2\pi}{\lambda} \cdot 1 \cdot d\cos\theta'} \\ \vdots \\ e^{j\frac{2\pi}{\lambda} \cdot (N-1) \cdot d\cos\theta'} \end{bmatrix}. \quad \text{(Eq. 2)}$$

In the Eq. 2, when M approaches infinity, the phase θ approaches the angle θ. In this case, the signal-to-noise (SNR) of radio signals received by the AP 50 is N times that of radio signals received by the smart antenna 52 indicated by the arrow shown in FIG. 3.

For example, if the AP 50 comprises only two smart antennas, just as the prior art AP 30 does, the SNR of radio signals received by the AP 50 is (1+10*log2 dB) times as large as that of radio signals received by the AP 30.

Figure 4:
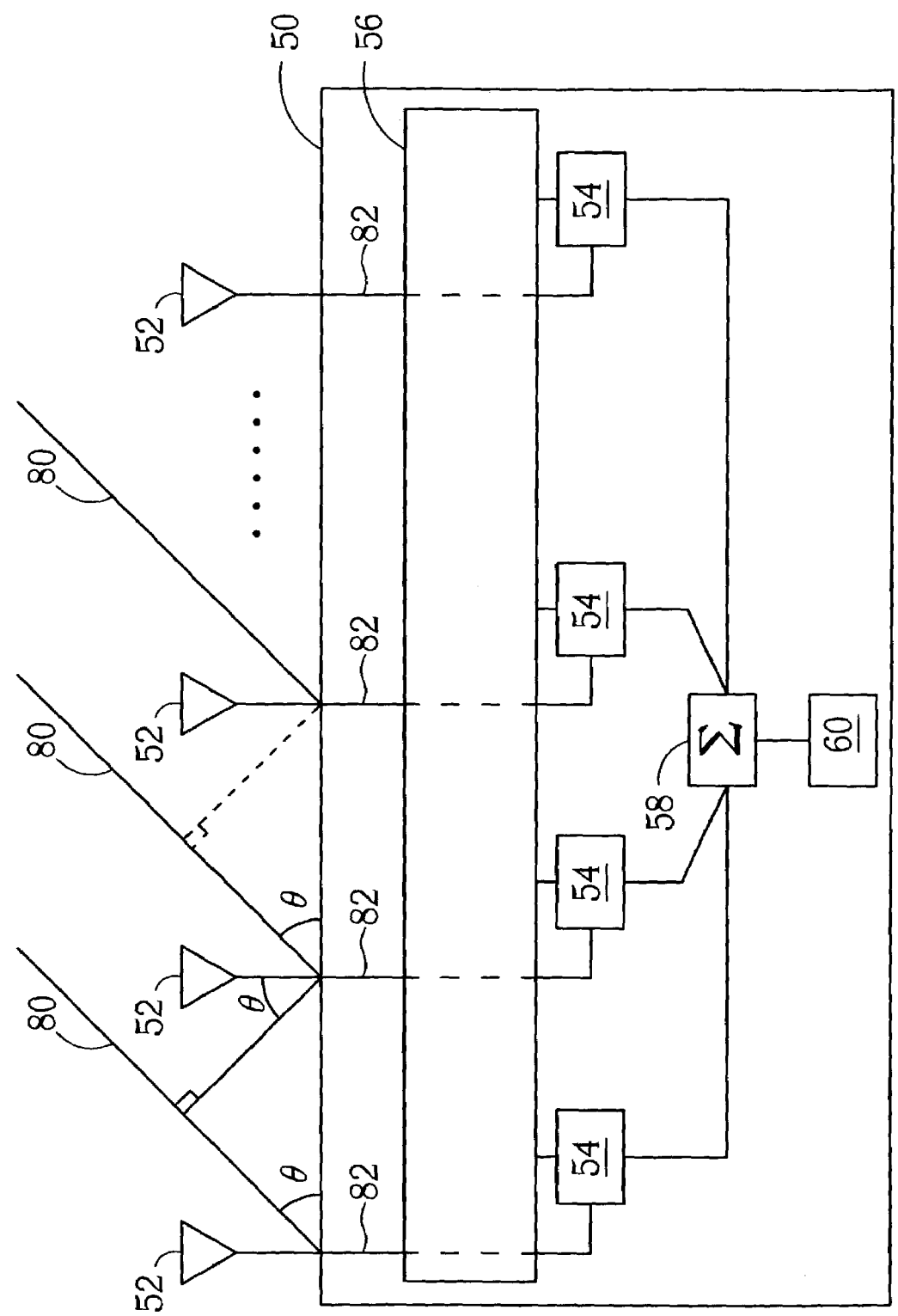
FIG. 4 is a function block diagram of the access point shown in FIG. 3.

Please refer to FIG. 4, which is a function block diagram of the AP 50 according to the present invention. The AP 50 comprises a plurality of smart antenna 52 for receiving a plurality of radio frequency (RF) signals 80 and for transforming the plurality of RF signals 80 to a plurality of base band signals 82, a processor 56 electrically connected to the plurality of smart antennas 52 for processing base band signals 82 transmitted from the plurality of smart antennas 52, a plurality of weighing modules 54 corresponding to the plurality of smart antennas 52 and electrically connected to the processor 56 and to the plurality of smart antennas 52 in a one-to-one manner, an adder 58 electrically connected to the plurality of weighing modules 54, and a receiver 60 electrically connected to the adder 58. The distance between two neighboring smart antennas is d. The RF signals 80 conform to the IEEE 802a/b/g standard. The adder 58 is used to sum up the weighed base band signals transmitted from the plurality of weighing modules 54 and to transmit the summed weighed base band signals to the receiver 60.

Figure 5:
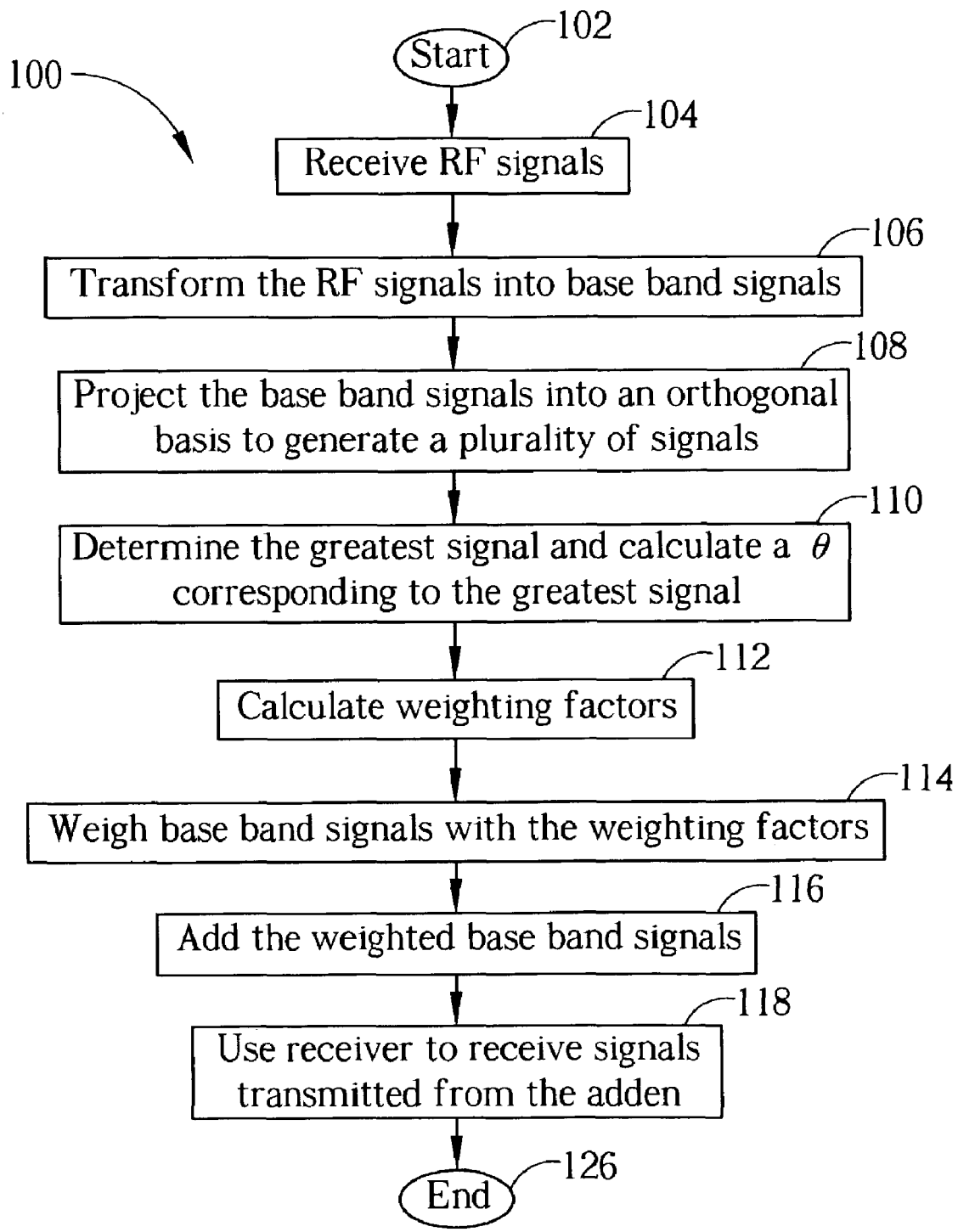
FIG. 5 is a flow chart of a method for receiving radio signals by using the access point shown in FIG. 4 according to the present invention.

Please refer to FIG. 5, which illustrates a flow chart of a method 100 for receiving the RF signals 80 by using the AP 50 according to the present invention. The method 100 comprises following steps:

Step 102: start;

Step 104: use the plurality of smart antennas 52 of the AP 50 to receive the RF signals 80 at a first time;

Step 106: use the plurality of smart antennas 52 to transform the RF signals 80 into base band signals 82;

Step 108: use the processor 56 to transform the base band signals 82 into a plurality of signals, each signal having a predetermined phase;

(That is, project the base band signal 82 onto the orthogonal basis to generate the plurality of signals.)

Step 110: determine the greatest signal in the plurality of signals generated in step 108 and calculate a phase θ corresponding to the greatest signal;

Step 112: use the processor 56 to calculate a plurality of weighing factors for the plurality of weighing modules 54 according to the phase θ;

Step 114: use each of the weighing modules 54 to weigh base band signals transmitted from a smart antenna 52 corresponding to the weighing module at a second time with a weighing factor corresponding to the weighing module 54;

Step 116: use the adder 58 to sum up all the weighed base band signals transmitted from the weighing modules 54;

Step 118: use the receiver 60 to receive signals transmitted from the adder 58; and Step 126: end.

In the method 100, steps 108, 110, and 112 need not be executed during every period. The processor 56 is allowed to execute the steps 108, 110, and 112 for every predetermined number of the periods. Compared to radio signals, AP 50 moves very slow. That is, as 10 or even 100 periods of the radio signals have passed, variation of relative displacement between the AP 50 and the wireless network subscriber or between the AP 50 and the environment surround the AP 50 still can be neglected, and so can d cos θ. Therefore, the weighing factors calculated according to a phase θ still can be utilized to weigh radio signals received by the AP 50 for the following ten (or 100) periods.

In the prior art AP 30, the controller 36 controls the switching circuit 38 to connect the receiver 40 to the first antenna 32 or to the second antenna 34 according to powers of radio signals received by the first antenna 32 and the power of radio signals received by the second antenna 34. The receiver 40 of the AP 30 can only receive radio signals transmitted from one antenna, so the SNR of radio signals received by the AP 30 is therefore low.

In contrast to the prior art, the present invention can provide a method for receiving wireless signals by using an AP. The AP comprises a plurality of antennas. The method calculates a plurality of weighting factors based on radio signals received by the plurality of antennas of the AP at a first time and weighs radio signals received by the plurality of antennas of the AP at a second time with the plurality of weighting factors to improve SNR.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for receiving radio signals by using an access point, the access point comprising a plurality of smart antennas and a processor, the method comprising:

using the plurality of smart antennas to receive first radio signals at a first time, the first radio signals comprising a plurality of vectors, each vector having a phase;

using the processor to sum up vectors having the same phase in the first radio signals respectively and to compare sums of the vectors having the same phase to find a first phase;

using the processor to weigh second radio signals received by the plurality of smart antennas at a second time according to the first phase and to sum up the weighed second radio signals.

2. The method of claim 1 further comprising:

projecting the first radio signals received by the plurality of smart antennas at the first time onto an orthogonal basis to generate a plurality of vectors having predetermined phases.

3. The method of claim 1 wherein the access point comprises two smart antennas.

4. The method of claim 1 wherein the radio signals received by the plurality of smart antennas conform to the IEEE 802.11a standard.

5. The method of claim 1 wherein the radio signals received by the plurality of smart antennas conform to the IEEE 802.11b standard.

6. The method of claim 1 wherein the radio signals received by the plurality of smart antennas conform to the IEEE 802.11g standard.

* * * * *